(12) United States Patent
Yang

(10) Patent No.: US 6,502,937 B2
(45) Date of Patent: Jan. 7, 2003

(54) EYEWEAR WITH PRESCRIPTION LENS INSERTS

(75) Inventor: Thomas Yang, Elmhurst, NY (US)

(73) Assignee: Stanley Schleger, North Hills, NY (US)

( * ) Notice: Subject to any disclaimer, the term of this patent is extended or adjusted under 35 U.S.C. 154(b) by 0 days.

(21) Appl. No.: 09/845,398

(22) Filed: Apr. 30, 2001

(65) Prior Publication Data

US 2002/0012098 A1 Jan. 31, 2002

Related U.S. Application Data

(60) Provisional application No. 60/201,706, filed on May 3, 2000.

(51) Int. Cl.⁷ .................................. G02B 7/08
(52) U.S. Cl. .................. 351/57; 351/47; 351/58
(58) Field of Search ............. 351/47, 48, 57, 351/58

(56) References Cited

U.S. PATENT DOCUMENTS

| | | | | |
|---|---|---|---|---|
| 3,453,042 A | * | 7/1969 | Cooper | 351/47 |
| 5,929,963 A | * | 7/1999 | McNeal | 351/47 |
| 6,206,519 B1 | * | 3/2001 | Lin | 351/47 |
| 6,290,354 B1 | * | 9/2001 | Safran | 351/57 |
| 6,386,703 B1 | * | 5/2002 | Huang | 351/57 |

* cited by examiner

Primary Examiner—Huy Mai
(74) Attorney, Agent, or Firm—Ostrolenk, Faber, Gerb & Soffen, LLP

(57) ABSTRACT

Eyewear comprising an eyewear frame, at least one lens in the eyewear frame; and an attachment device for holding a prescription lens insert so that the prescription lens insert is held in position adjacent the lens of the eyewear thereby to correct the vision of a wearer of the eyewear.

14 Claims, 5 Drawing Sheets

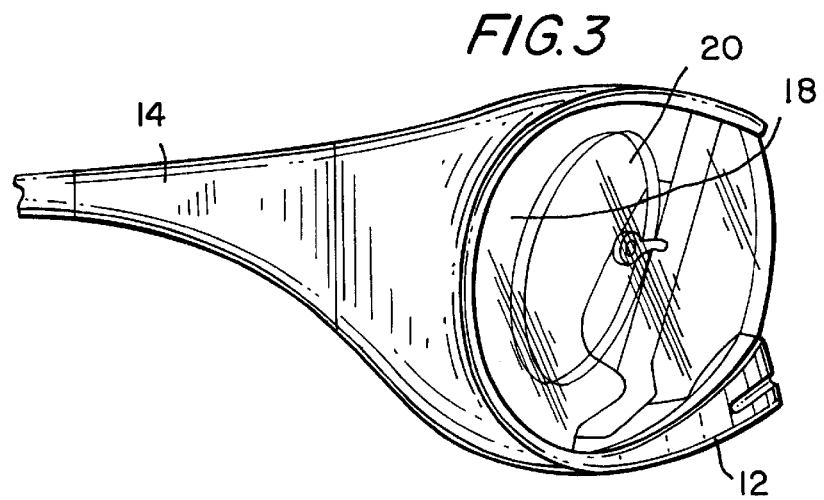
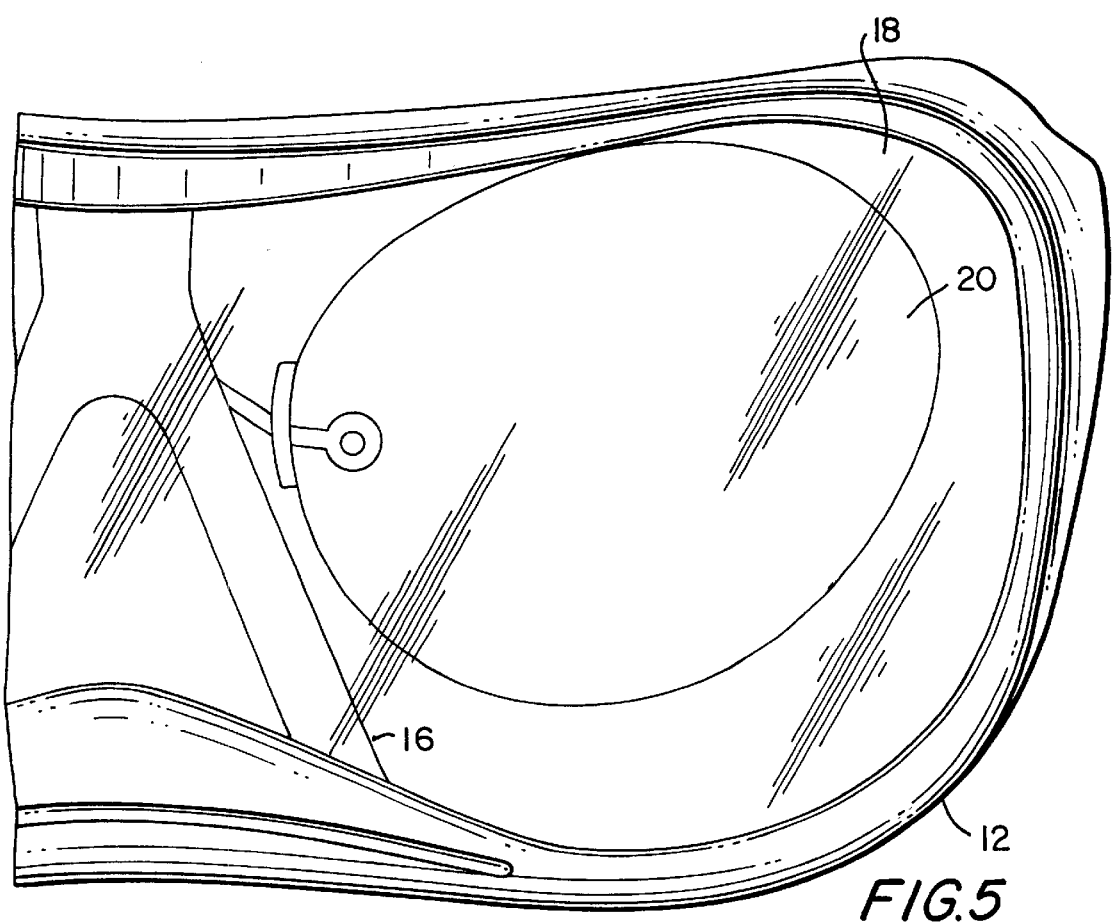

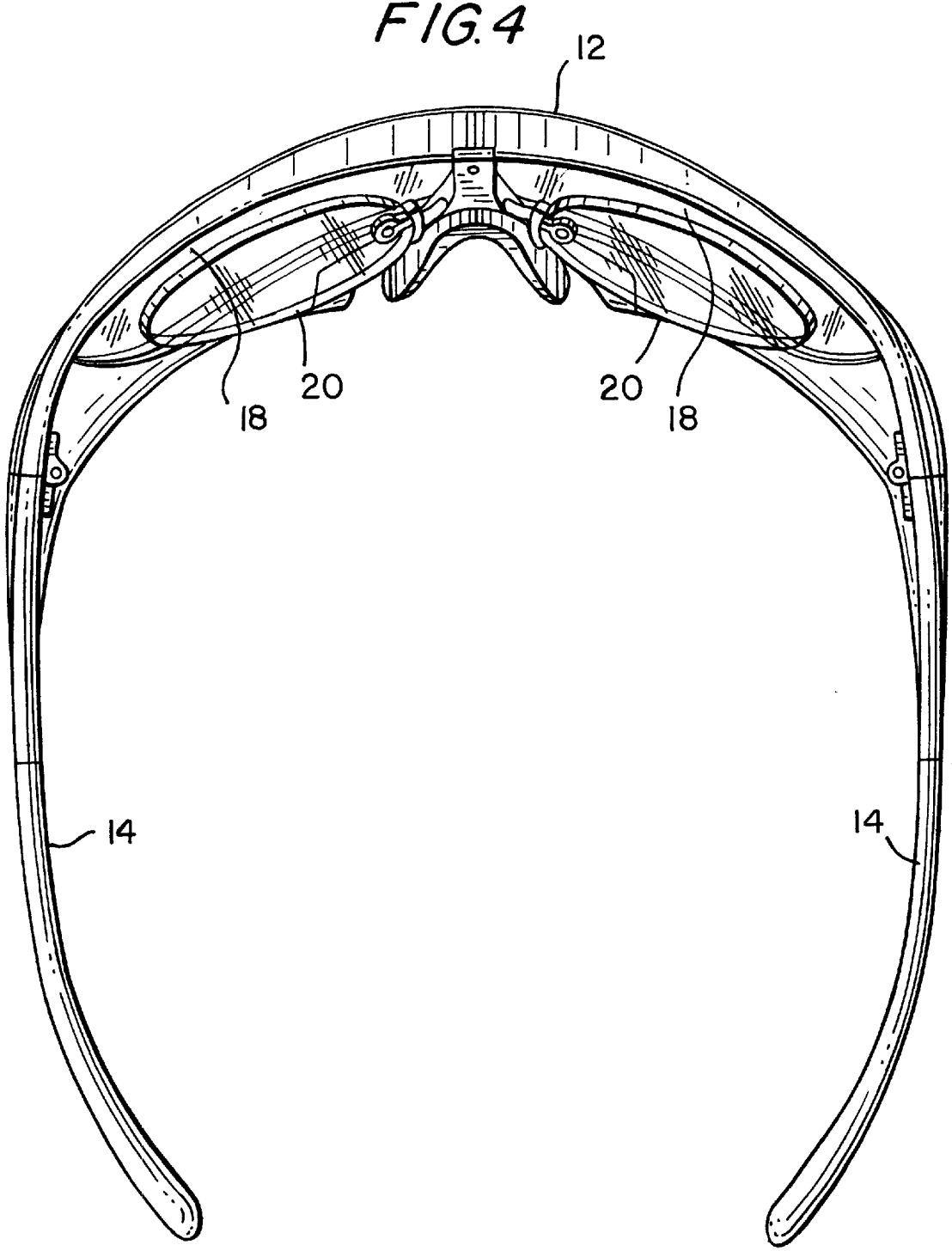

EYEWEAR WITH PRESCRIPTION LENS INSERTS

CROSS REFERENCE TO RELATED APPLICATION

This application claims the benefit and priority of U.S. Provisional Patent Application No. 60/201,706 filed May 3, 2000 and incorporates by reference the entire disclosure thereof.

BACKGROUND OF THE INVENTION

The present invention relates to eyewear, and in particular to eyewear which can be adapted to be used with prescription lenses.

A common problem for those who wear prescription eyewear is that they cannot wear non-prescription eyewear such as sun glasses or protective goggles because the sunglasses do not correct for their particular eyesight, i.e., the sunglasses are not their prescription. Those with prescription eyewear either must resort to obtaining prescription sunglasses or goggles obtain clip-on sun or protective eyewear which clip on to their prescription eyewear. Another alternative is to use bulky goggles over the prescription eyewear. Prescription sun eyewear suffers from the disadvantage that is expensive and much of the clip-on sun eyewear suffers from the disadvantage that it is either flimsy, scratches or mars the prescription eyewear because it is often in contact with the prescription eyewear or is generally inconvenient to use.

The prior art methods allowing wearers of prescription eyewear to obtain protection for their eyes from the sun, or otherwise are either inconvenient or expensive. Generally, wearers of prescription eyewear cannot wear the inexpensive sunglasses which are available to those who do not require prescription eyewear.

SUMMARY OF THE INVENTION

The present invention is directed to solving the above problem. The present invention provides eyewear having an attachment device, preferably disposed on the nosebridge of the eyewear, and preferably disposed behind, instead of in front of, the lens of the non-prescription eyewear. The attachment device receives a prescription lens insert which is preferably rimless and relatively smaller compared to the non-prescription lens of the eyewear.

According to one embodiment, a wire bridge holds the prescription lens insert or inserts and is attached to the nosebridge of the main frame of the non-prescription eyewear. In one embodiment, the nosebridge has a small groove that holds the wire bridge, which wire bridge snap fits or is otherwise held in the groove. The invention is useful with any type of non-prescription eyewear including sunglasses and goggles, for example, skiing goggles.

BRIEF DESCRIPTION OF THE DRAWINGS

The invention will be described in greater detail in the following detailed description with reference to the drawings in which:

FIG. 3 is a side view;

FIG. 4 is a top view;

FIG. 5 is a partial detailed front view;

DETAILED DESCRIPTION OF EMBODIMENTS OF THE INVENTION

Figure 1:
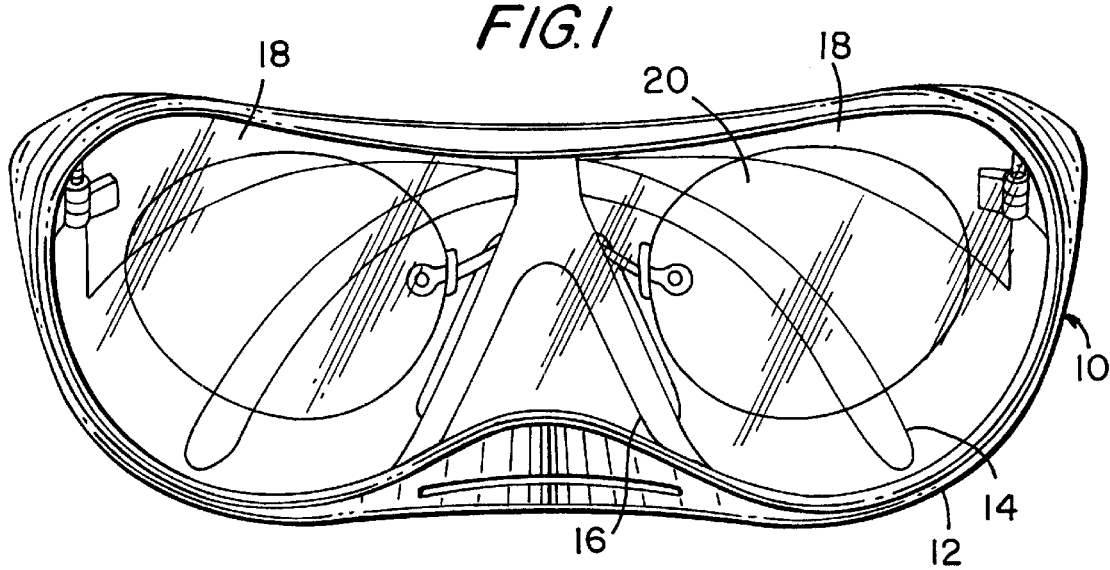
FIG. 1 is a front, partially phantom view of the eyewear according to the invention incorporating the prescription lens insert mechanism.
Figure 2:
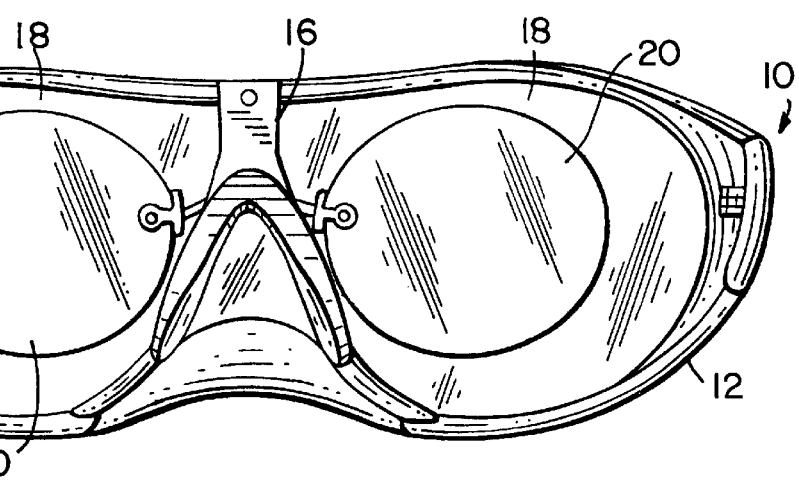
FIG. 2 is a rear or inside view of the invention.
Figure 6:
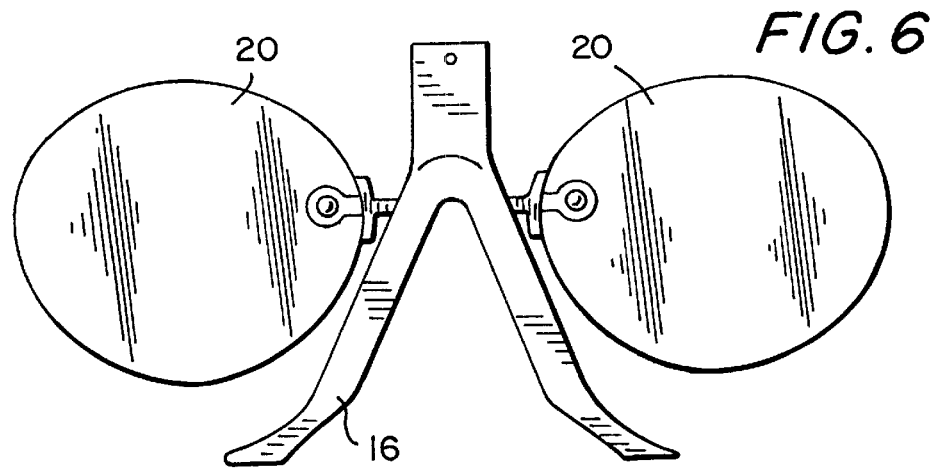
FIG. 6 is a schematic view of the invention having a removable nose bridge.
Figure 8:
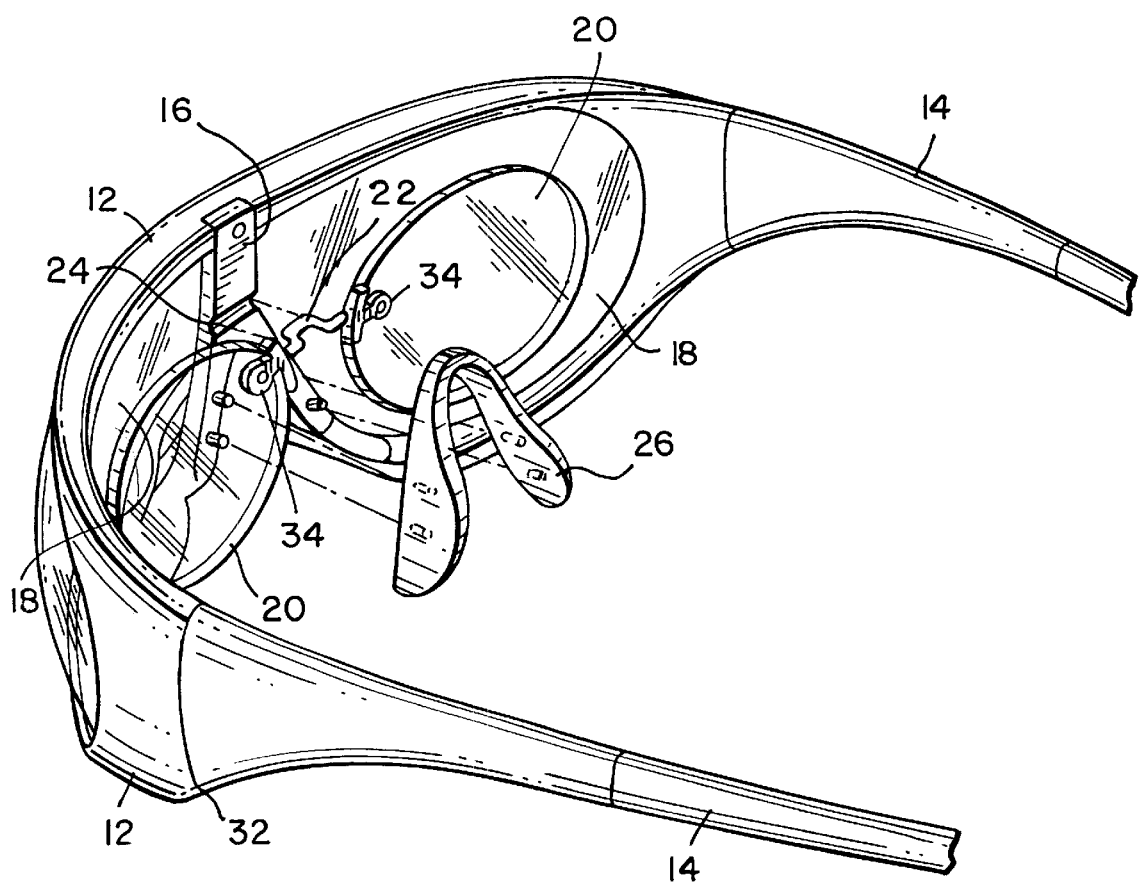
FIG. 8 is a perspective view of the invention wherein a non-integral nose bridge is employed.

With reference to the drawing figures, the invention comprises eyewear generally indicated at 10, having a main frame 12 and temples 14 hingedly connected to the main frame 12. See FIGS. 3 and 4. The mainframe 12 includes a nose bridge 16. The nosebridge 16 may comprise an inverted Y shaped section as shown molded integrally with the frame 12 or attached to the frame 12 by suitable attaching means, for example, screws as shown in FIG. 8. The frame 12 has a lens 18 disposed therein for protecting the wearer's eyes, for example for providing sun protection or protection from flying objects.

According to the invention, the eyewear 10 is provided with an attachment device for attaching prescription lens inserts 20 to the eyewear 10. In this way, the non-prescription eyewear 10 can be used by persons who require prescription eyewear. The invention can also be used by those who do not require prescription eyewear by simply not using the prescription inserts.

Figure 7A:
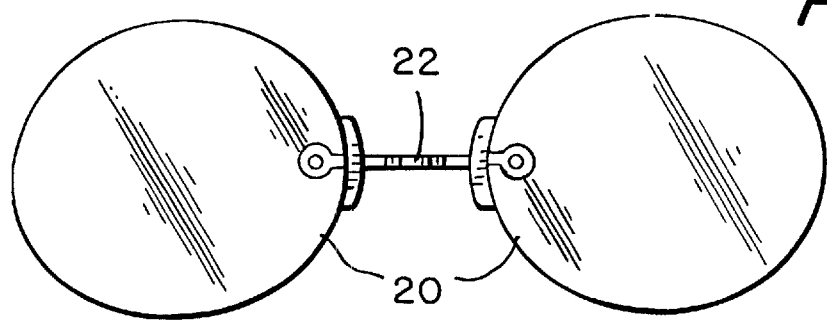
FIGS. 7A, 7B, 7C and 7D are front, rear, top and side views of the prescription lens inserts according to the invention.
Figure 7B:
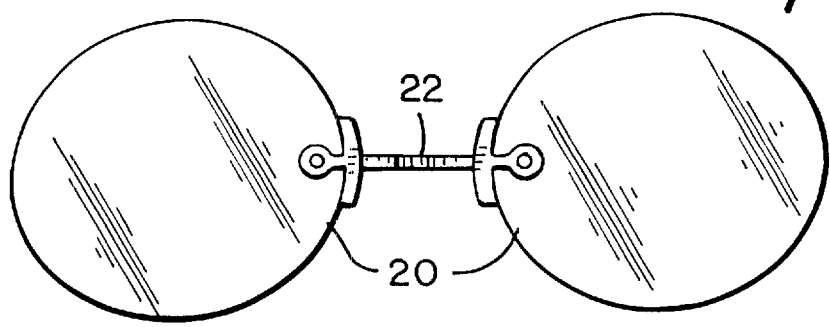
Figure 7C:
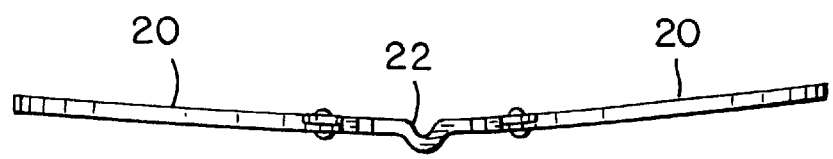
Figure 7D:
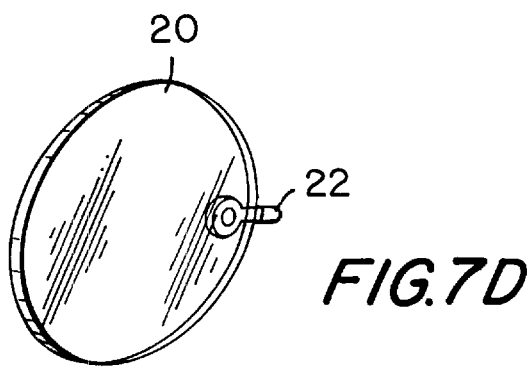

According to one embodiment of the invention, the nosebridge 16 includes an attaching device for attaching the prescription lens inserts 20 to the eyewear 10. As shown in the drawing figures, in particular FIGS. 7A–7D, the prescription insert can comprise two lenses 20 coupled by a bridge, for example a wire bridge 22. The wire bridge 22 may have the bent shape as shown in the top view of FIG. 7C. The bent portion, as shown more clearly in FIG. 8, is adapted to be disposed in a groove 24 of the nosebridge 16. As shown in FIG. 8, the nosebridge 16 may have a soft rubberized or plasticized member 26 attached thereto, to provide comfort to the wearer's nose. In one embodiment, the soft comforting member 26, which is adapted to rest on the nose of the wearer, is removeable, and the wire bridge 22 is inserted in the channel 24. The soft comforting member 26 is then snapped or otherwise disposed into place thereby to hold the wire bridge 22 in the channel 24. Alternatively, the wire bridge 22 may be simply held in place by a snap insertion in the channel 24 or any other suitable means. Further, a wire bridge need not be used. Any suitable fastening mechanism can be employed to hold the prescription inserts in place. Further, if a bridge 22 is used, it need not be made of wire, but can be made of any suitable material, including plastic, etc.

As shown in the drawing figures and particularly FIG. 8, the prescription lens inserts 20 may be fastened to the wire bridge 22 by suitable means such as rivets or screws 34, or any other suitable means. The inserts can, for example, have rims, if desired, and the rims can have suitable attaching devices.

The prescription inserts 20 are, of course, prescribed so as to correct the vision of the wearer and may be made of any suitable material, e.g., glass or plastic, etc.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. Eyewear comprising:

an eyewear frame;

at least one lens in the eyewear frame; and an attachment device for holding a prescription lens insert so that the prescription lens insert is held in a position adjacent the lens of the eyewear thereby to correct the vision of a wearer of the eyewear; further comprising a nose bridge attached to the frame of the eyewear, the attachment device being attached to the nose bridge; and wherein the attachment device comprises a horizontally extending channel in the nose bridge opening rearwardly, and further wherein the prescription lens insert comprises two prescription lens inserts, one for each eye of the wearer connected by a bridge, and wherein the bridge is received in the channel of the nose bridge, and further wherein the bridge is inserted slidably into the rearwardly opening channel.

2. The eyewear of claim 1, further wherein the bridge comprises a wire bridge.

3. The eyewear of claim 2 wherein the nose bridge is integral with the frame.

4. The eyewear of claim 2 wherein the nose bridge is fastened to the frame by a fastener.

5. The eyewear of claim 2 further comprising a temple opposite each frame end hingedly connected to the frame.

6. The eyewear of claim 1, wherein the bridge is received as a snap fit into the channel.

7. The eyewear of claim 6, wherein the bridge is provided with a bent portion, the bent portion being received in the channel.

8. The eyewear of claim 1, wherein the bridge is received in the channel and a nose comforting member is attached to the nose bridge to hold the bridge and thus prescription inserts in place.

9. The eyewear of claim 1 wherein the prescription lens insert is held by the attachment device behind the lens.

10. The eyewear of claim 1, wherein the lens provides sun protection.

11. A prescription lens insert for non-prescription eyewear, the prescription lens insert comprising two lenses; a supporting member attached to the two lenses; the supporting member comprising a member adapted to be received by an attachment device of the non-prescription eyewear; further wherein the supporting member comprises a bridge connecting the two lenses, the bridge being adapted to be attached to the attachment device of the eyewear and further wherein the non-prescription eyewear comprises eyewear comprising:

an eyewear frame;

at least one lens in the eyewear frame; and an attachment device for holding the prescription lens insert so that the prescription lens insert is held in a position adjacent the lens of the eyewear thereby to correct the vision of a wearer of the eyewear; further comprising a nose bridge attached to the frame of the eyewear, the attachment device being disposed on the nose bridge; and wherein the attachment device comprises a horizontally extending channel in the nose bridge opening rearwardly, and wherein the bridge of the prescription lens insert is received in the channel of the nose bridge, and further wherein the bridge is inserted slidably into the rearwardly opening channel.

12. The prescription lens insert of claim 11, wherein the bridge comprises a wire bridge.

13. The prescription lens insert of claim 11, wherein the bridge comprises a member having a substantially linear extent with a portion thereof bent away from the linear extent of the bridge for being received in the attachment device of the eyewear.

14. The prescription lens insert of claim 11 wherein the attachment device holds the prescription insert behind a lens of the eyewear.

* * * * *